Jan. 27, 1925.
T. O. PERRY
HELICOPTER AIRCRAFT
Filed Aug. 21, 1922
1,524,309
4 Sheets-Sheet 2
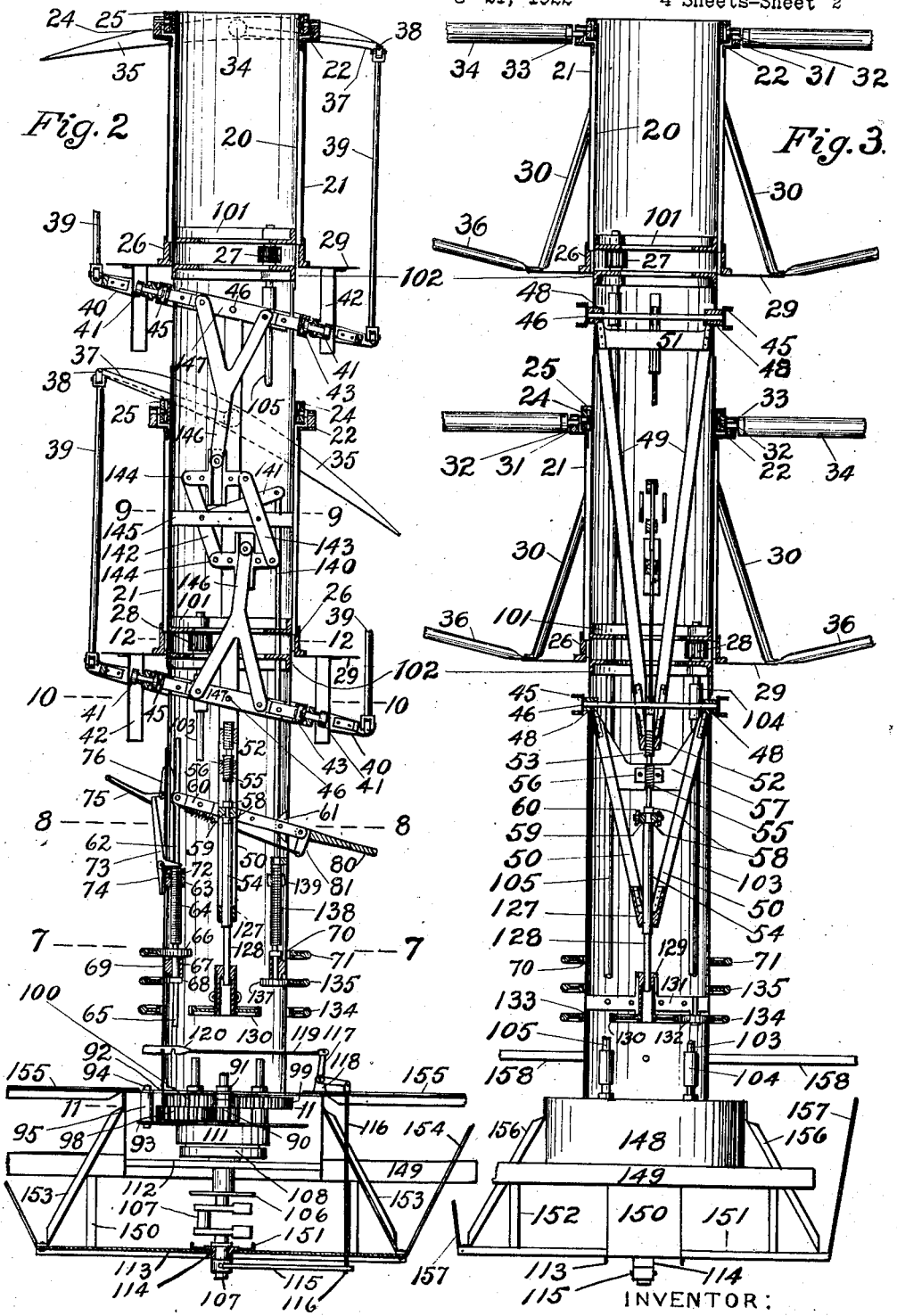
INVENTOR:
Thomas O. Perry.

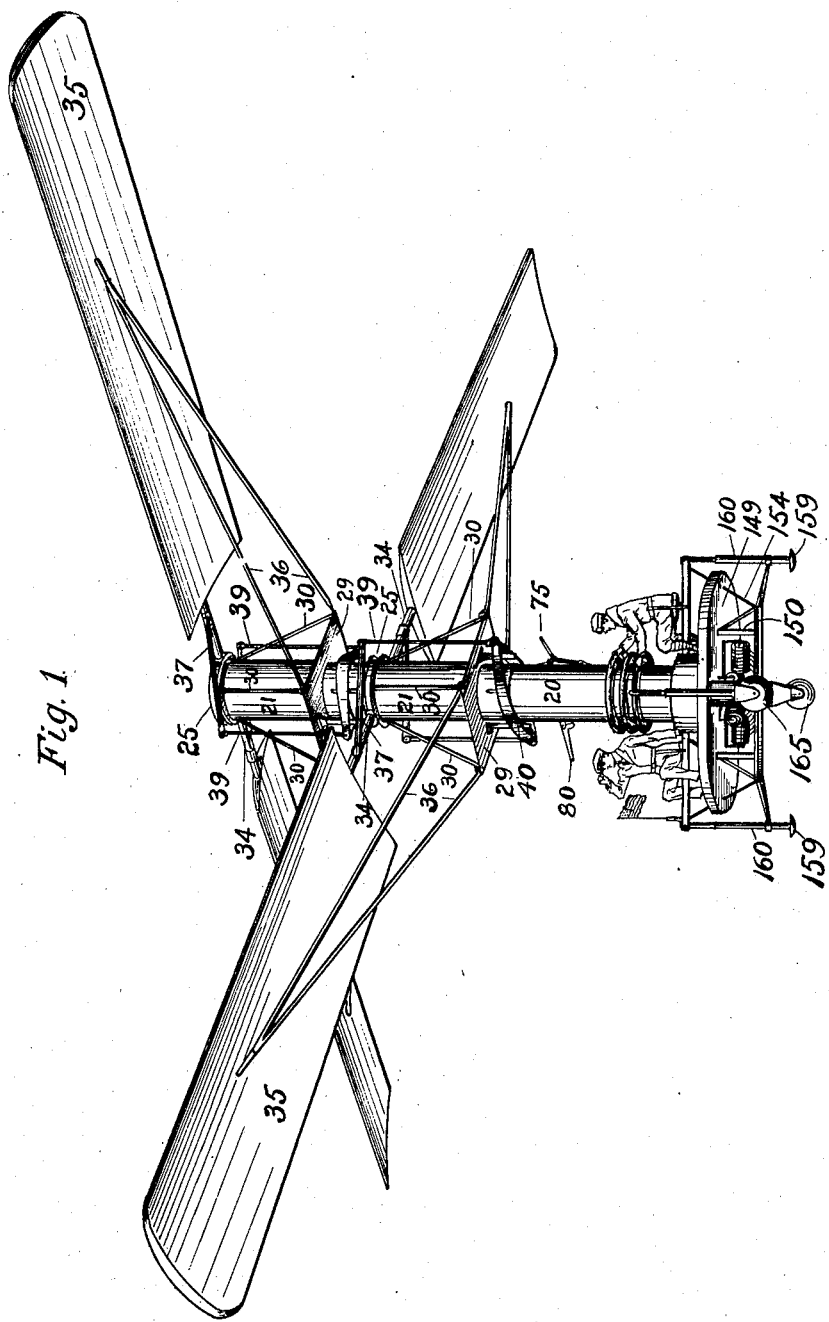

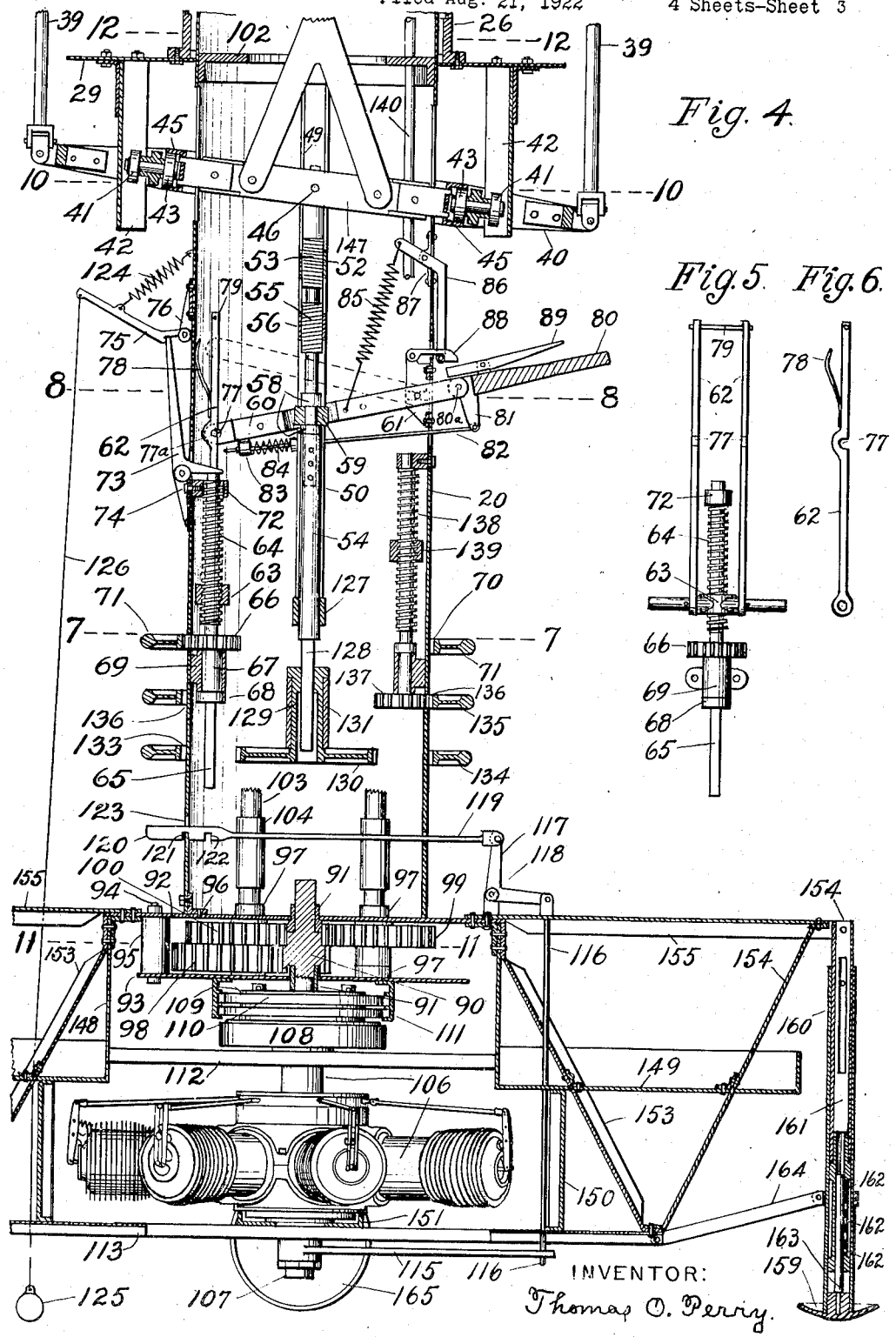

Jan. 27, 1925.
T. O. PERRY
1,524,309
HELICOPTER AIRCRAFT
Filed Aug. 21, 1922
4 Sheets-Sheet 4
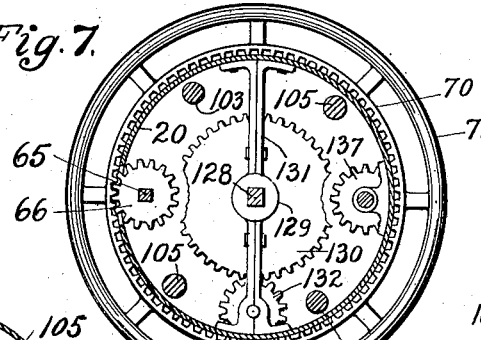
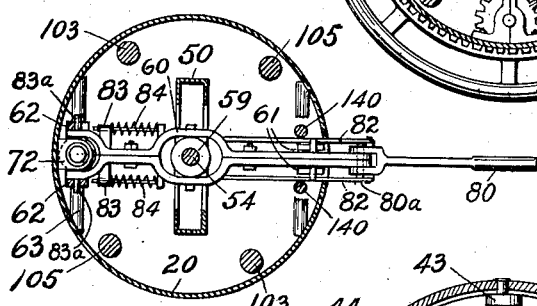
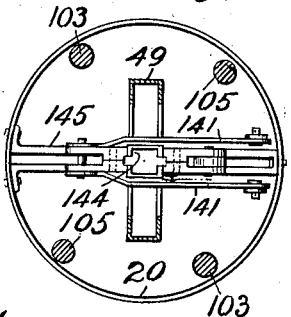
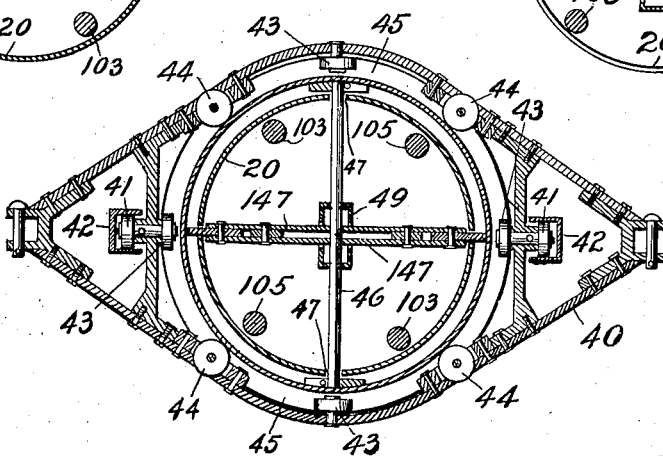
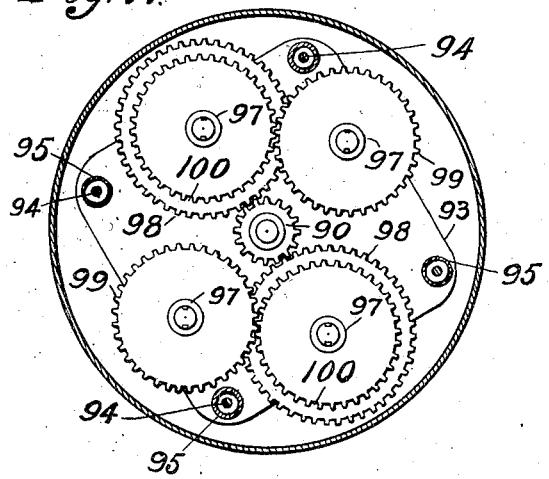
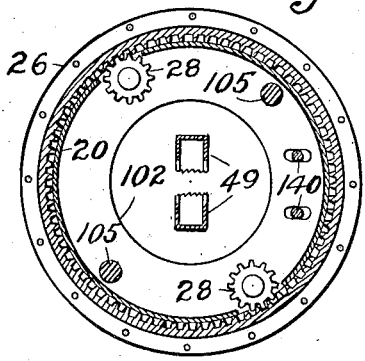
INVENTOR:
Thomas O. Perry.

Patented Jan. 27, 1925.

1,524,309

UNITED STATES PATENT OFFICE.

THOMAS O. PERRY, OF OAK PARK, ILLINOIS.

HELICOPTER AIRCRAFT.

Application filed August 21, 1922. Serial No. 583,149.

*To all whom it may concern:*

Be it known that I, THOMAS O. PERRY, a citizen of the United States, residing at Oak Park, in the county of Cook and State of Illinois, have invented a new and useful Helicopter Aircraft, of which the following is a specification.

My invention relates to improvements in helicopter aircrafts in which two oppositely revolving sets of wings are placed one over the other with concentric axes, very much the same in general structure as is shown in my previous patent for aircraft, No. 1,345,101, issued June 29, 1920, and among the objects of my improvement are, to guard against too abrupt collision with the ground, in case of motor failure; to provide auxiliary mechanism for quick control of altitude in cases of emergency; to provide convenient mechanism for resetting various parts of the device in its normal operative position; and such further objects, advantages, and capabilities as will hereinafter more fully appear.

My invention further resides in the combination, construction and arrangement of parts illustrated in accompanying drawings, and, while I have shown therein a preferred embodiment of my invention, I desire the same to be understood as illustrative only and not as limiting my invention.

I attain these objects by the mechanism illustrated in the accompanying drawing, in which—

Fig. 1 is a perspective view of the whole machine as it would appear in flight to an observer on the ground; Fig. 2, a sectional side view of the spinal column and parts immediately connected therewith taken in a central plane parallel with the direction of travel: Fig. 3, a sectional rear view of the spinal column and parts connected therewith taken in central plane at right angles to the direction of travel. Fig. 4, an enlarged sectional side view of the lower part of the spinal column and connected parts corresponding to the position of Fig. 1 and also showing the revolving cylinder motor; Fig. 5, an enlarged front view of the double feathering links, altitude screw, and operative parts; Fig. 6, an enlarged side view of one of the feathering links with spring attached; Fig. 7, an enlarged horizontal plan of one of the hand grips and control gears taken substantially along a plane cutting the spinal column at 7—7, Figs. 2 and 4; Fig. 8, an enlarged plan of the feathering lever and auxiliary attachments, showing in horizontal section the spinal column substantially along the plane indicated by the line 8—8, Figs. 2 and 4; Fig. 9, an enlarged plan of the traction lever and ways taken substantially along a plane cutting the spinal column at 9—9, Fig. 2; Fig. 10, an enlarged plan of the feathering ring and feathering way, shown in section, substantially along a plane indicated by the line 10—10, Figs. 2 and 4; Fig. 11, an enlarged plan of the main driving gears taken substantially along a horizontal plane cutting just below the base of the spinal column at 11—11, Figs. 2 and 4; and Fig. 12, an enlarged plan of the wing drum gears substantially along the plane cutting the spinal column at 12—12, Figs. 2 and 4.

Referring more in detail to the annexed drawings; numeral 20 denotes the spinal supporting column which is tubular in form, made of thin sheet metal, and normally vertical. The wing drums are indicated by numeral 21 and are also made of thin sheet metal, are tubular in form, and encircle the upper portion of the spinal column, one over the other. These drums have flanges 22 at their upper ends provided with rollers 24 adapted to roll within confining drum races 25 in the form of channeled rings secured to the spinal column. These rollers fix the position of the drums longitudinally while permitting them to revolve about the column. Secured to the base of each drum is a flanged gear wheel 26 having internal teeth adapted to mesh with the drum pinions 27 and 28 which project through openings in the spinal column inside of which they have their bearings secured thereto. A square truss plate 29 of sheet metal is secured externally to each of the internal gear wheels 26. Drum struts 30 rigidly connect the corners of the drum plates with the upper drum flanges 22 just beneath the rollers 24. Two pivot blocks 31, having fixed pivot pins 32, are secured to each of the drum flanges 22 on diametrically opposite sides and each pivot pin 32 loosely pierces a threaded wing nut 33, the nut being confined longitudinally between the pivot block and a head on the pin. The wing arms 34 are made of light tubing of considerable diameter; their inner ends screwing on to the wing nuts 33 so as to have pivotal connection with the drum flanges 22. The wings 35 have a light frame work rigidly secured to the wing arms, the whole being covered with suitable canvas or the like. The outer extremities of the wings extend some distance beyond the outer ends of the wing arms. Wing stays 36 converge from the widely separated corners of the truss plate 29 to a point on each wing just in front of the outer end of each wing arm where the connection is made flexible so as to permit feathering of the wings. Wing levers 37 are rigidly secured to the inner ends of each wing arm and extend diagonally therefrom terminating in wing cranks 38 which have their locations outside the peripheries of the wing drums in vertical planes which centrally intersect the drums at right angles to the wing arms as shown in Figs. 1 and 2. Wing links 39 have universal joints at both ends and pivotally connect the crank of each set of wings with opposite ends of a feathering ring 40 located beneath each drum. Guide rollers 41 on the feathering rings engage vertical feathering guides 42 which rigidly depend from the truss plates 29.

Each feathering ring 40 also carries two sets of rollers 43 and 44 which travel in the channel of a feathering race 45, the rollers 43 bearing against one or the other of two parallel flanges separated from each other by about the diameter of the rollers and the rollers 44 bearing against the web which unites the two flanges forming therewith the channel, open around the outer periphery of each feathering race.

Each feathering race 45 is supported at diametrically opposite sides on a pivot rod 46 which passes through vertical slots 47 in the spinal column. Each pivot rod 46 is supported in pivot bearings 48 close against the inner wall of the spinal column on opposite sides, (see Fig. 3) and these pivot bearings have supporting feathering pillars 49 and 50. The upper set of pivot bearings 48, joined by the cross bar 51, rest on the pillars 49 which converge downward and terminate in a direction nut 52 carried by the direction screw 53 at the upper end of the feathering shaft 54. Just below the direction screw 53, the feathering shaft has a reverse direction screw 55 which carries the reverse direction nut 56 bolted between the cross plates 57 uniting the pillars 50 whose upper ends carry the lower set of pivot bearings 48. These direction screws are provided, one with a left hand thread and the other with a right hand thread. The feathering shaft 54 is also provided with two collars 58 between which the shaft carries a loose fitting thrust sleeve 59 (see Figs. 3 and 8) having opposite trunnions projecting therefrom which pivot in the split feathering lever 60 midway between its extremities. One end of this feathering lever has a slotted fulcrum 61 attached to the inner wall of the spinal column and the other end is connected by means of double feathering links 62 with a trunnioned altitude nut 63 (see Fig. 5) adapted to normally travel vertically on the altitude screw 64 which has a square shank 65 of some length at its lower end. This square shank 65 fits loosely and is free to slide vertically through a square hole in the altitude pinion 66 from which depends a sleeve journal 67 (see Fig. 2) provided with a collar 68 at its lower end. The sleeve journal 67 has, between the altitude pinion 66 and the collar 68, a bearing 69 attached to the inner wall of the spinal column. The teeth of the altitude pinion 66 engage, through a slot in the spinal column, with an internal altitude grip gear 70 (Fig. 7) whose teeth surround and loosely bear against the outer surface of the spinal column. To this internal grip gear is attached the altitude hand grip wheel 71. The upper portion of the altitude screw 64 is free to slip vertically through a guide 72, which loosely surrounds the threads and is attached to the spinal column, except when vertical movement of the screw is prevented by the L shaped stop lever 73, (Figs. 2 and 4) the short arm of which is shown as pressing upon the upper end of the screw. This stop lever is fulcrumed in a bracket 74 fixed on the outer wall of the spinal column which has an opening through which the short arm of the stop lever 73 reaches the altitude screw. The long arm of the stop lever is shown held in an upright position, outside of the spinal column, by means of the trip latch 75 fulcrumed on a bracket 76 fixed to the outer wall of the spinal column. By lifting this trip latch the long arm of the stop lever 73 is released to drop down withdrawing the short arm from interference with vertical movement of the altitude screw 64.

The double feathering links 62 connect with the feathering lever 60 by means of notches 77 opening inward and are kept in operative connection with the pivot pins 77ª on the feathering lever by flat springs 78 fixed to the links so that their free ends press against and may move vertically along the inner wall of the spinal column. A tie rod 79 unites the upper ends of the double links which extend some distance above the notches 77.

A releasing hand lever 80 is pivoted to the end of the feathering lever 60 at 80ª where it reaches through an aperture in the wall of the spinal column near its slotted fulcrum 61, and has a short dependent arm 81 connecting pivotally with double push rods 82. These push rods have guides 83 fixed to the feathering lever 60 (see Figs. 4 and 8) in proximity to the double feathering links 62 and are directed to engage and push the feathering links off from their connecting pivot pins 77ª whenever the hand lever 80 is depressed. Compressed retaining springs 84, reacting between the guides 83 and collars fixed to the push rods, ordinarily prevent contact with the feathering links.

A supplemental spring 85 is shown as stretched between the feathering lever 60 and the short arm of a bent lever 86 which fulcrums on a bracket 87 fixed to the inner wall of the spinal column. The long arm of this bent lever protrudes through an opening in the wall of the column and its lower end is retained in the position shown by a retaining latch 88 fulcrumed within the column and reaching out through an opening therein to a latch pin in the end of the bent lever. A releasing trigger 89 is fulcrumed between its ends upon the hand lever 80 so that the one end lies beneath the end of the retaining latch and the other end is within easy reach of the outer end of the hand lever, so that depressing the outer end of the trigger will lift the retaining latch, release the bent lever and relax the tension of the supplemental spring.

The motive pinion 90, having spur teeth, is centrally located at the base of the spinal column 20 and journaled between vertical bearings 91 which are held by upper and lower bearing plates 92 and 93 rigidly secured to each other by strong bolts 94 inclosed by spacing blocks 95 of cylindrical form. The upper bearing plate 92 is fixed to the base of the spinal column by means of angle irons 96 and its circular periphery projects considerably outside of the column. These bearing plates also support other vertical bearings 97 between which are journaled the motive gears 98 and counter-gears 99. The motive gears directly engage the motive pinion and the counter-gears mesh with the inter-gears 100 which are fixed to the motive gears.

The drum pinions 27 and 28 have their bearings in bearing rings 101 and 102 fixed to the interior wall of the spinal column both above and below each set of pinions. Vertical connecting shafts 103 (Figs. 2, 4 and 10) extend from the motive gears 98 to the lower drum pinions 28 the protruding gear journals joining the shaft in couplings 104. In a similar manner the counter-gears 99 connect with the upper drum pinions 27 by means of the vertical shafts 105 (Figs. 3 and 10.)

The motor 106, preferably of the revolving cylinder type in which the crank shaft 107 is normally held in a stationary position, revolve about a vertical axis in line with the axis of the motive pinion 90 with which it connects by means of an intervening disconnectable clutch which may be of any suitable known construction. The particular form of clutch 108—109—110 here shown is fully described in U. S. Patent No. 1,345,100 issued to me June 29, 1920. A circular shield 111 incloses some parts of the clutch mechanism. The motor could also be directly and permanently connected with the motive pinion without detriment to my present purpose. The motor has bearings in upper and lower channel bars 112 and 113, the lower end of the crank shaft 107 having a collar which rests upon a bearing 114 in the lower channel bar 113 through which the shaft protrudes and carries fixed thereto a retaining arm 115 which extends beneath the channel bar beyond the range of the revolving cylinder heads so as to engage the lower end of the vertical retaining rod 116. This retaining rod 116 pierces loosely the outer extremity of the retaining arm 115 and is free to slide vertically through a guiding hole in the lower channel bar 113 and its upper end has pivotal connection with the horizontal arm of the bell-crank 117 whose fulcrum 118 is fixed upon the upper bearing plate 92. The vertical arm of the bell-crank pivotally connects with a disengaging rod 119 which is shown as reaching through apertures in the walls of the spinal column and terminating in a flattened handle 120 having two notches 121 and 122 adapted to engage the lower side of the aperture 123. The aperture 123 is vertically elongated so that the handle 120 can be lifted sufficiently for changing its engagement from one notch to the other. When the notch 122 is engaged with the aperture 123 the retaining rod 116 is completely withdrawn from the extremity of the retaining arm 115 leaving the arm free to revolve with the crank shaft 107. As the single stationary crank of a revolving cylinder motor usually has several pitman connections, the system of pistons and connections would be generally out of balance when the crank is allowed to revolve, but the retaining arm 115 may be made sufficiently heavy and so extended to one side as to cause rotational balance.

Another means of disengaging the trip latch 75 from the stop lever 73 is shown in Fig. 4 in which a release spring 124, stretched between the long arm of the trip latch 75 and the spinal column, is given sufficient tension to lift the trip latch and release the stop lever 73 except when prevented from doing so by a hanging weight 125 which is suspended from the long arm of the trip latch by a latch cord 126. This weight may be lifted by grasping the cord, or, if the weight is allowed to hang several feet below the lowest part of the entire structure, it will be automatically lifted by contact with the ground a little in advance of actual landing of the machine during vertical descent.

The pillars 50 converge downward and unite in a guide 127 within which the feathering shaft 54 is free to revolve and slide longitudinally. At its lower end the feathering shaft has a terminal 128 which is square in cross section and adapted to slide vertically in the journal 129 of the direction gear 130, the upper end of the journal having a square opening to fit the square terminal loosely. The direction gear 130 is underneath the split bracket 131 which spans the spinal column and forms a bearing for the journal 129 whose upper end has a shoulder resting on the upper end of the bracket bearing. The direction pinion 132 meshes with the direction gear 130 and also engages the direction grip gear 133 in the same manner as the altitude pinion 66 engages the altitude grip gear 70. This direction pinion turns on a headed pin fixed to the split bracket 131. The direction hand grip 134 is attached to the rim of the grip gear 133.

The remaining parts, by which is produced, through continuous automatic feathering, the tractive effort of the wings, remain essentially the same as shown in my patent mentioned above, No. 1,345,101. These parts include the traction hand grip 135, traction gear 136, traction pinion 137, traction screw 138, traction nut 139, traction links 140, traction lever 141, paralleling links 142, and 143, traction ways 144, supporting bracket 145, traction arms 146, and traction bars 147 by which the feathering races 45 can be tipped forward more or less towards the direction of travel. The result of thus tipping the feathering races forward is shown in Fig. 2 where the upper wing which offers some resistance to progress is shown feathered so as to make the resistance as little as possible while the corresponding lower wing which moves rearward is feathered to a great angle so as to increase propulsive effort. These are the positions they take while revolving when the wing arms are at right angles to the direction of travel. When the oppositely revolving wings arrive to a position where their arms are parallel with the course, or at right angles to the pivot rods 46 of the feathering races, they both again have equal weather angles for that one position. In all other positions their weather angles are more or less reversed, by their forward tip. This, as well as the feathering for turning to right or left is explained in my prior Patents Nos. 1,272,846 and 1,345,101 and need not be explained in detail here, the following brief description being given to facilitate understanding of the operation of the present invention. It will be understood that both races are simultaneously inclined and the continuous feathering of all four wings results automatically from the inclination of the races.

When hand grip 135 is actuated, gear 137 and screw shaft 138 are actuated. This causes nut 139 to move along shaft 138 and results in links 140 rocking levers 141 about their pivots. It will be evident that this will cause members 146 to rock members 147 about pivot rods 46. It is thus clear that the leading edge of one wing of a pair may be elevated while the leading edge of the opposite one may be in substantially zero weather angle or a position of small angle at times during each revolution in accordance with the desires of the operator. At the same time the wings of the other pair are in opposite position, i. e., when the right wing of the upper pair is in greatly inclined position and the left wing approximately horizontal, the left wing of the lower pair will be greatly inclined and the right wing approximately horizontal for wing positions at right angles to the course. This will give traction.

The cylindrical housing 148, inclosing the motive gear and clutch, is fixed beneath the upper bearing plate 92 and supports at its lower end the pilot's platform 149. The posts 150 rigidly connect the lower channel bar 113 with the pilot's platform. The cross bar 151 is secured to the lower channel bar 113 at right angles thereto and is also supported from the pilot's platform by the posts 152. Diagonal braces 153 connect the outer extremities of the lower channel bar 113 with the upper part of the cylindrical housing 148. Tie bars 154 diverge outward from the ends of the channel bar 113 to near the outer extremities of fore and aft channel bars 155 whose inner ends are secured to the upper bearing plate 92. In like manner braces 156 and tie bars 157 extend from the extremities of the cross bar 151 to the housing 148 near the outer ends of the lateral channel bars 158 whose inner ends are secured to the spinal column 20 near its base. Ground bumpers 159 terminate the lower ends of tubular sheaths 160 within which are suspended loose fitting hollow plungers 161 hung by pivotal connection from the outer extremities of the fore and aft channel bars 155. The power end of each hollow plunger is somewhat reduced in diameter and has a vertical row of small radial perforations 162 leading into a reduced central bore which receives loosely a stop-off rod 163 whose lower end is fixed to the bumper 159. Guide links 164 have pivotal connection at each end of the lower channel bar 113 and also with the tubular sheaths 160. The hollow plunger 161 is supposed to contain a quantity of oil which flows through the small perforations 162 into the tubular sheath below the plunger when the machine leaves the ground. A carrying wheel 165 is connected with the cross bar 151, at opposite ends thereof, for rolling the aircraft into and out of its hangar, or for favorable position in starting flight. The parts including 148 to 165 inclusive are the same in form and function as the like parts fully described in Patent No. 1,345,101 above mentioned.

The mechanism for directing flight in right or left direction, as here shown, is somewhat modified from previous construction, though the same end is accomplished through differential feathering of the oppositely revolving sets of wings, as shown in Patent No. 1,345,101 above mentioned. From the construction described it is evident that when the direction wheel 134 is turned by hand in either direction, the feathering shaft 54 will turn in the opposite direction and that the direction nut 52 will be either raised or lowered carrying with it the upper feathering race 45 which connects, through the feathering ring 40 and wing links 39, with the upper set of wings 35. Thus the wings are feathered to a greater or less angle with their plane of revolution. In the same way the lower set of wings will be feathered through depression or elevation of the reverse direction nut 56 which connects with the lower feathering race. But, as the direction nut and reverse direction nut have respectively left and right hand threads, they will simultaneously move in opposite directions causing one set of wings to assume a greater weather angle whenever the weather angle of the other set is decreased. When the two sets of oppositely revolving wings react equally against the air, they have no tendency to turn other parts of the craft about their vertical axis, and travel will be straight ahead in the direction of wing propulsion as previously explained. But when their respective torsional resistances are unbalanced by turning the direction grip 134 to right or left, the direction of travel will be changed in a direction contrary to the greater torsional resistance of the wings having the increased weather angle. Naturally the parts are so arranged that the hand grip is turned to correspond in direction with the change of travel desired.

When the feathering shaft 54 is moved bodily upward, without turning, all the wings in both sets are feathered alike to a greater weather angle and all the wings are feathered in the same degree to a smaller weather angle by moving the feathering shaft bodily downward. These vertical movements of the feathering shaft affect the lifting force of the wings, for altitude only, the lift being increased generally by increasing the inclination with the planes of wing revolution. The feathering shaft 54 is elevated or depressed by means of the feathering lever 60 at the will of the pilot by turning the altitude hand grip 71 to the right or to the left causing the altitude nut 63 to travel up or down on the altitude screw 64, in much the same way as shown in my previous patent above mentioned. But the square shank 65, made capable of slipping vertically through the altitude pinion 66, the stop lever 73 and the trip latch 75, which ordinarily prevent vertical movement of the altitude screw, are new features having for their object a quicker movement of the feathering lever in certain emergencies, than has hitherto been provided for.

Ordinarily the feathering movements do not call for rapidity of action, and if the movements should be too much hastened by increasing the pitch of the altitude screw threads, the pilot would be required to exert greater muscular effort. The principal emergency when quick action might be useful would be in case of forced landing because of motor failure. As long as the motor functions properly, the wings would be feathered to a positive weather angle, or angle at which they lift when motor driven, in which positive condition the altitude nut 63 would occupy a position on the upper half of the altitude screw. Fig. 2 shows the position of the altitude nut for maximum lift by the motor. But, if the motor fails to work, the pilot will need to change the weather angle of the wings to negative by running the altitude nut to the lower half of the altitude screw as shown in Fig. 4. In this position the wings will continue to revolve in the same direction as when motor driven, because the ensuing forced descent will produce a relative rush of air upward causing the wings to revolve by wind action like a wind mill, and the dead motor, unless disconnected, will be driven by the wings without stopping or reversing its direction of revolution. In this case also the pilot will still have full control of direction and rate of travel the same as when the wings are driven by the motor. The action of the wings when set at a negative angle is analogous to that of an ordinary airplane while volplaning, the difference being that the wings volplane in a spiral path while the body of the machine may or may not travel horizontally with respect to the earth, though, when there is horizontal wind, its drift can be counteracted through manipulation of the traction hand grip 135 sufficiently to insure truly vertical descent. In other words, in addition to the spiral volplaning of the wings only, the aircraft as a whole can volplane enough to overcome the natural drift of the wind. It has been shown experimentally that the wind driven revolving wings, under the most unfavorable condition, that is in dead air when there is no natural wind, offer resistance to descent equal to that of a solid disc of the same diameter as the peripheral circle in which the wing tips revolve. I have found this to be true when only one set of wings is used constructed substantially as shown. I have found by experiment that the volplaning resistance to descent of the wind driven revolving wings is considerably augmented by increasing the negative weather angle from zero to as much as eight degrees, though the wings will continue to revolve with the effect described at any negative angle or at even the zero angle, if so set before their motor driven motion is lost. As the greatest resistance to descent is offered by a large negative weather angle, the altitude nut 63 should naturally be placed well down on the altitude screw in case of motor failure, from which position it could not in the ordinary way at once be abruptly transferred to its highest position on the screw corresponding to the greatest positive angle and lift. But, if the trip latch 75 is lifted, allowing the long arm of the stop lever 73 to drop down, the altitude screw will be free to rise quickly if the feathering lever 60 is by any means forced upward. The supplemental spring 85 provides the force, if needed, for quickly raising the feathering lever whenever it is released. Or the feathering lever can, when released as stated, be directly manipulated through the hand lever 80 without aid or interference of the altitude screw. Ordinarily, however, since the wing links 39 are normally always under tension through the reaction of the wings against the air, the supplemental spring 85 may be dispensed with as unnecessary for causing quick feathering of the wings for greater lift.

It is anticipated that the releasing mechanism for quickly augmenting the lifting force of the wings will be most frequently useful on near approach to the earth during descent. Therefore, I have also provided automatic means for lifting the trip latch 75. A release spring 124 is given sufficient tension to lift the latch except as its tension is counteracted by the weight 125 hung by a cord 126 attached to the trip latch. The weight 125 may be allowed to hang any desired distance below the landing wheels so as to be lifted by contact with the ground, releasing the trip latch in time to prevent shock if descent should happen to be too rapid. In case of forced descent on account of motor failure, the sudden change from negative to positive weathering of the wings would render available the stored up energy of the wind driven motor and wings to actuate the wings positively during a brief period of time.

The wings, when weathered negatively, during volplaning descent can be wind driven at greater speed of revolution than their normal speed when motor driven and the kinetic energy thus stored in the wings alone may suffice ordinarily for sufficiently maintaining their motion after the sudden change of weather angle requires them to positively lift instead of being negatively wind driven. But it is important that kinetic energy shall also be stored in the revolving cylinder motor when wind driven to help keep the wings revolving after the weather angle is changed to positive. In order that the motor may not unduly resist being driven by the wings on account of piston friction or accident, provision is made whereby the normally stationary crank shaft 107 may be released by the pilot so as to revolve with the cylinders as previously described.

Other means for releasing the feathering lever 60 from control through the altitude nut 63 and feathering links 62 are shown in Figs. 2, 4, 5, 6 and 8. In this case it is proposed to effect a quick release and movement of the feathering lever 60 in either direction, up or down, at the will of the pilot. In order that the feathering lever 60 may drop down when released from the links 62, the weight of the lever and other parts which have to be lifted at the same time therewith must be sufficiently heavy to overcome the lifting effect of the wings which ordinarily are so balanced about their pivotal axes as to lift strongly through the wing links 39. This makes it necessary to use the supplementary spring 85 for producing the upward movement of the feathering lever when released from the feathering links 62. With the spring 85 under tension as shown in Fig. 4 the depression of the hand lever 80 will disengage the feathering links 62 and cause the feathering lever 60 to fly up to the limit of its movement, from which position, or from any other position it can be released to drop down by depressing both the releasing trigger 89 and the hand lever 80. This release immediately on landing would prevent a rebound from the earth in case of excessive lift due to sudden feathering of the wings in the positive direction.

These quick movements of the feathering lever, as distinguished from the more leisurely and easy movements effected ordinarily through the altitude grip and altitude screw, can be made but once without replacing by hand the disengaged parts. The altitude nut 63 can readily be raised or lowered through manipulation of the altitude grip to the position where the feathering links 62 will reengage themselves with the end of the feathering lever.

While the primary object of the supplementary quick release of the feathering lever is to make landing safe and free from shock, especially in case of forced descent after motor failure, there may be other conditions of usefulness for quick feathering even when the motor functions normally.

For example, in case of threatened collision, it might be useful to either rise or fall with unusual celerity above or below unexpected obstacles.

Having now described my invention, I claim:—

1. In an air craft, the combination with radially pivoted wings, a feathering lever connected with said wings, a screw shaft for controlling altitude, a hand grip for rotating said screw shaft, an altitude nut adapted to travel longitudinally on said screw shaft, and an actuating connection between said altitude nut and said feathering lever, of means for abruptly releasing said feathering lever from control by said altitude nut, leaving said lever free to immediately assume whatever position it will under the guidance of gravitation, wing resistance or other influence.

2. In an air craft, the combination with radially pivoted wings revoluble about a vertical axis, a motor for revolving said wings, a feathering lever connected with said wings, a feathering screw shaft for controlling altitude, a hand grip for rotation of said screw shaft, an altitude nut adapted to travel longitudinally on said screw shaft and an actuating connection between said altitude nut and said feathering lever, of means for abruptly releasing said feathering lever from control by said altitude nut, leaving said lever free to immediately assume whatever position it will under the guidance of gravitation, wing resistance or other influence.

3. In an air craft, the combination with radially pivoted wings revoluble about a vertical axis, a revolving cylinder motor having a normally stationary crank shaft, a feathering lever connected with said wings, a feathering screw shaft for controlling altitude, a hand grip for rotating said screw shaft, an altitude nut adapted to travel longitudinally on said screw shaft and an actuating connection between said altitude nut and said feathering lever, of mechanism for abruptly releasing said feathering lever from control by said feathering nut, a retaining arm fixed to said crank shaft for holding it stationary under normal conditions, a retaining rod for holding said arm fixed in position and means for withdrawing said retaining rod at will from engagement with said retaining arm.

4. In an air craft having pivoted wings, a feathering lever connected with said wings, a screw shaft for controlling the feathering lever, a hand grip for rotating said screw shaft, an altitude nut adapted to travel longitudinally on said screw shaft and an actuating connection between said altitude nut and feathering lever, the combination with the feathering lever of means for abruptly releasing said feathering lever from control by said altitude nut, whereby said lever is made free to immediately assume whatever position it will under the guidance of gravitation, wing resistance or other influence.

5. In an air craft, the combination with wings revoluble about a vertical axis and each pivoted about an axis at an angle to the first axis, a revolving cylinder motor having a normally stationary crank shaft, a feathering lever connected with said wings, a feathering screw shaft for controlling said wings to control the altitude of the machine, a hand grip for rotating said screw shaft, an altitude nut adapted to travel longitudinally on said screw shaft and an actuating connection between said altitude nut and said feathering lever, of mechanism for abruptly releasing said feathering lever from control by said feathering nut, a retaining arm fixed to said crank shaft for holding it stationary under normal conditions, a retaining rod for holding said arm in fixed position and means for withdrawing said retaining rod at will from engagement with said retaining arm.

6. In a construction of the character described having wings pivoted to move about longitudinal and transverse axes, a feathering lever to actuate said wings about the longitudinal axes, a screw for actuating said lever, and a hand grip for rotating said screw, the combination with said feathering lever of means for quickly releasing said lever for free movement about its pivot and means for positively actuating said lever, when released.

7. In an air craft, the combination with two superposed sets of radially pivoted wings adapted to revolve horizontally in opposite directions, a revolving cylinder motor for actuating said wings, said motor having a fixed crank shaft, driving gears for transmitting the power of said motor, and a supporting spinal column, of feathering races, race followers connected with said wings, mechanism whereby at the will of the operator the position of said races may be changed bodily for altering the amplitude of the weather angles of the wings at any time, and means for releasing the crank shaft of the engine for rotation with the engine cylinders.

8. In an air craft, the combination with superposed sets of radially pivoted wings adapted to revolve horizontally in opposite directions, a revolving cylinder for actuating said wings, said motor having a fixed crank shaft, driving gears for transmitting the power of said motor, and a supporting spinal column, of feathering races, race followers connected with said wings, mechanism whereby at the will of the operator the positions of said races may be changed bodily for altering the amplitude of the weather angles of the wings at any time, means for normally holding said crank shaft from rotation and means to release said holding means.

9. In an air craft of the character described having wings, means to revolve said wings about a normally substantially vertical axis and means to rock said wings about axes radial to the first named axis, the combination with the last named means of means to release said last named means from control so that the wings may be free to rock unrestrained within certain limits.

10. In an air craft of the character described having wings, means to revolve said wings about a normally substantially vertical axis and means to rock said wings about axes radial to the first named axis, including a lever, the combination with the last named means of means to release said last named means from control so that the wings may be free to rock unrestrained, within certain limits, and means to actuate said lever when released.

11. In an air craft, in combination, radially pivoted wings revoluble about a vertical axis, feathering mechanism for inclining said wings at will to either positive or negative weather angles, a revolving cylinder motor, for actuating said wings, having a crank shaft normally fixed in position, a retaining arm rigidly attached to said crank shaft, a retaining rod for holding said retaining arm rigidly attached to said crank for withdrawing said retaining rod from engagement with said retaining arm, whereby the pilot may at will release said normally fixed crank shaft so that it may revolve freely with the cylinders of said motor.

12. In an air craft, the combination with radially extending pivoted wings revoluble about a vertical axis, a feathering lever connected with said wings to control the inclination thereof, a feathering screw shaft for manually controlling altitude, an altitude nut adapted to travel longitudinally on said screw shaft, actuating connections between said altitude nut and said feathering lever, and a motor having cylinders which normally revolve about a fixed crank shaft, of mechanism for abruptly breaking connection between the feathering lever and altitude nut, a retaining arm for holding said crank shaft fixed against revolution, and means whereby the retaining arm may be released at will for allowing said crank shaft to revolve freely with said cylinders.

13. In an air craft, the combination of radially extending wings revoluble about a vertical axis, means for feathering said wings, means for actuating said feathering means, and means for abruptly breaking connection between the feathering means and the actuating means.

14. In an air craft, the combination of wings revoluble about an axis for lifting the air craft, means for feathering said wings, a normally fixed crank shaft, an engine rotatable with respect thereto for driving said wings, and means for releasing said crank shaft to permit the shaft to revolve freely with the engine when the engine fails to work normally.

15. In an air craft, the combination of wings revoluble about an axis for lifting the air craft, means for feathering said wings, a normally fixed crank shaft, an engine rotatable with respect thereto for driving said wings, means for releasing said crank shaft to permit the shaft to revolve freely with the engine when the engine is not working normally and additional means to permit quick feathering of the wings to an opposite angle.

16. In an air craft, the combination with radially pivoted wings revoluble about a normally substantially vertical axis, a motor for actuating said wings, a feathering lever connected with said wings, an altitude nut detachably connected with said feathering lever, a manually operable altitude screw for raising or depressing said altitude nut and a supplemental spring normally tending to lift said feathering lever, of mechanism for abruptly breaking connection between the feathering lever and altitude nut and means for relaxing at will the tension of said supplemental spring.

17. In an air craft, in combination, superposed sets of radially pivoted wings adapted to revolve in opposite directions about a vertical axis, a motor for actuating said oppositely revolving sets of wings, a manually operable feathering lever displaceable vertically, a rotatable feathering shaft longitudinally displaceable by swivel connection with said feathering lever, direction and reverse direction superposed screws on said feathering shaft, one having left hand and the other right hand threads, a direction nut carried by said direction screw, a reverse direction nut carried by said reverse direction screw, feathering connection between said direction nut and the upper set of revolving wings, feathering connection between said reverse direction nut and the lower set of revolving wings, and means for rotating said feathering shaft in reverse directions at will.

In witness whereof, I hereunto subscribe my name to this specification.

THOMAS O. PERRY.

Certificate of Correction.

It is hereby certified that in Letters Patent No. 1,524,309, granted January 27, 1925, upon the application of Thomas O. Perry, of Oak Park, Illinois, for an improvement in "Helicopter Aircraft," an error appears in the printed specification requiring correction as follows: Page 8, line 34, claim 11, strike out the words "rigidly attached to said crank" and insert instead *in a fixed position means;* and that the said Letters Patent should be read with this correction therein that the same may conform to the record of the case in the Patent Office.

Signed and sealed this 14th day of April, A. D. 1925.

[SEAL.] KARL FENNING,
*Acting Commissioner of Patents.*